US012808415B2

(12) United States Patent
Shahin

(10) Patent No.: US 12,808,415 B2
(45) Date of Patent: Nov. 24, 2026

(54) CALIPER BRAKE

(71) Applicant: HL MANDO CORPORATION, Pyeongtaek-si (KR)

(72) Inventor: Hatem Shahin, Pfaffenhofen (DE)

(73) Assignee: HL MANDO CORPORATION, Gyeonggi-do (KR)

( * ) Notice: Subject to any disclaimer, the term of this patent is extended or adjusted under 35 U.S.C. 154(b) by 354 days.

(21) Appl. No.: 18/420,506

(22) Filed: Jan. 23, 2024

(65) Prior Publication Data

US 2024/0280151 A1 Aug. 22, 2024

(30) Foreign Application Priority Data

Feb. 20, 2023 (DE) ......................... 102023104123.1

(51) Int. Cl.

| | |
|---|---|
| ***F16D 65/02*** | (2006.01) |
| ***F16D 55/226*** | (2006.01) |
| ***F16D 65/00*** | (2006.01) |
| ***F16D 65/12*** | (2006.01) |
| *F16D 55/00* | (2006.01) |

(52) U.S. Cl.

CPC ......... *F16D 65/123* (2013.01); *F16D 55/226* (2013.01); *F16D 65/0068* (2013.01); *F16D 2055/0016* (2013.01); *F16D 2055/005* (2013.01); *F16D 2065/1304* (2013.01); *F16D 2065/1392* (2013.01)

(58) Field of Classification Search

CPC ............... F16D 65/0068; F16D 65/123; F16D 65/1304; F16D 65/1392; F16D 55/226; F16D 2055/0016; F16D 2055/005

USPC .................................. 188/17, 18 A, 218 XL

See application file for complete search history.

(56) References Cited

U.S. PATENT DOCUMENTS

| | | | |
|---|---|---|---|
| 2,655,229 | A | 10/1953 | Eksergian |
| 2,701,626 | A | 2/1955 | Walther, Sr. |
| 3,213,969 | A | 10/1965 | Rosanowski et al. |
| 3,405,784 | A | 10/1968 | Henry-Biabaud |
| 3,424,277 | A | 1/1969 | Barnes |

(Continued)

FOREIGN PATENT DOCUMENTS

| | | | |
|---|---|---|---|
| DE | 3446437 | 7/1986 | |
| DE | 3446437 C2 * | 4/1995 | ........... F16D 65/123 |

(Continued)

OTHER PUBLICATIONS

German Patent and Trade Mark Office, Application No. 102023104123.1, Office Action dated Jan. 24, 2024, 31 pages.

*Primary Examiner* — Christopher P Schwartz

(74) *Attorney, Agent, or Firm* — WOMBLE BOND DICKINSON (US) LLP

(57) ABSTRACT

The caliper brake includes a brake disc configured to rotate with a wheel, an inner brake pad and an outer brake pad each disposed at one of two sides of the brake disc, a press member configured to press the inner brake pad toward the brake disc, and a caliper housing provided so that the press member is movable forward and backward, wherein the brake disc includes a hub connected to an axle, a rubber provided to come into contact with the brake pad and disposed to be spaced a predetermined distance from the hub in an axial direction, and an accommodation part formed between an inner surface of the hub and an outer surface of the rubber to accommodate at least a part of the outer brake pad.

13 Claims, 4 Drawing Sheets

(56) References Cited

U.S. PATENT DOCUMENTS

| | | | | | |
|---|---|---|---|---|---|
| 4,282,952 | A * | 8/1981 | Bartley | B60T 1/065 180/10 |
| 2023/0296150 | A1* | 9/2023 | Shahin | F16D 65/0075 |
| 2023/0304549 | A1* | 9/2023 | Shahin | F16D 65/0075 |
| 2023/0417297 | A1* | 12/2023 | Shahin | F16D 65/0006 |

FOREIGN PATENT DOCUMENTS

| | | |
|---|---|---|
| KR | 20-0153366 | 8/1999 |
| KR | 10-0337554 | 11/2002 |
| KR | 102285893 | 1/2019 |

* cited by examiner

[FIG. 1]
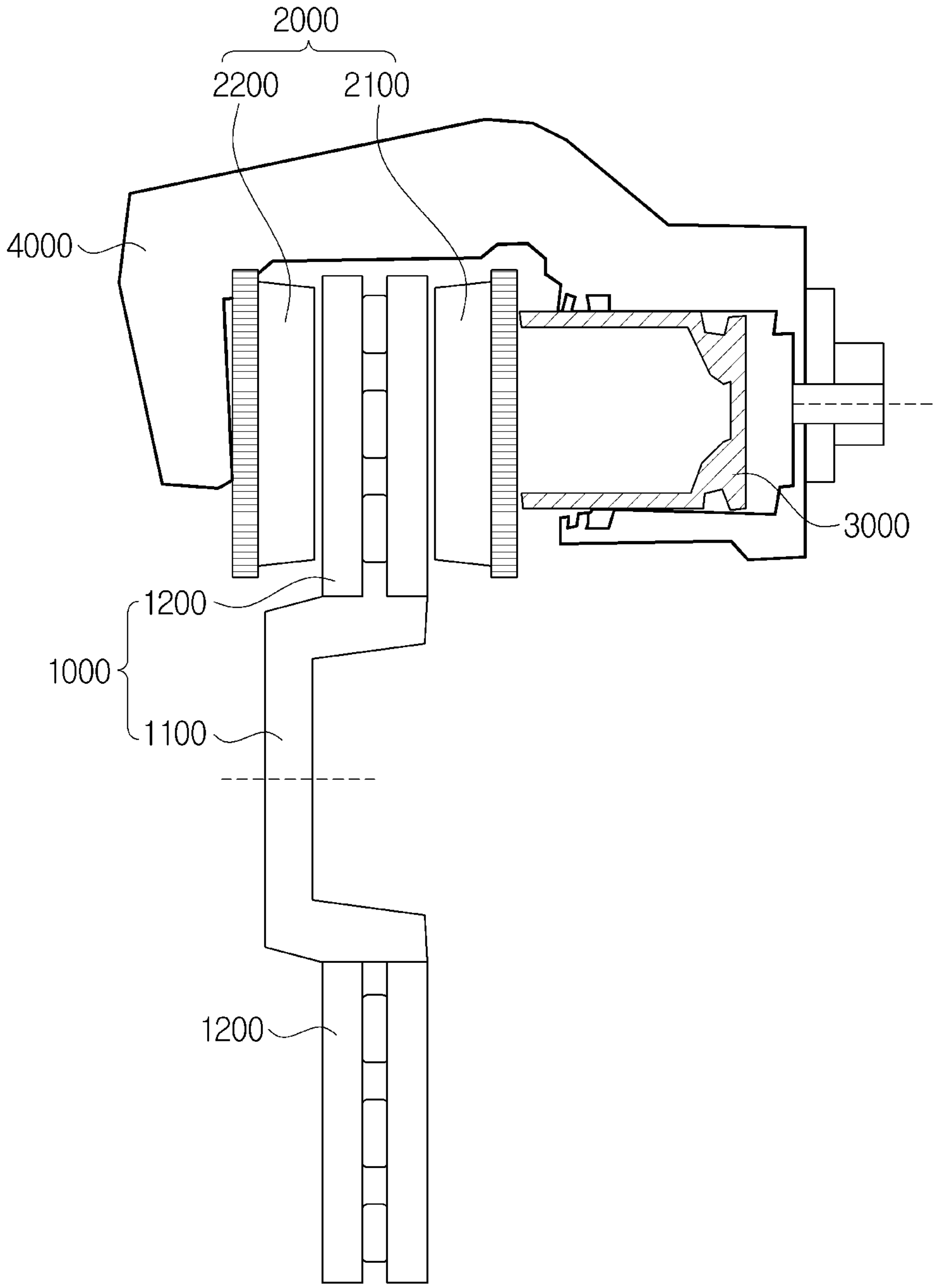

[FIG. 2]
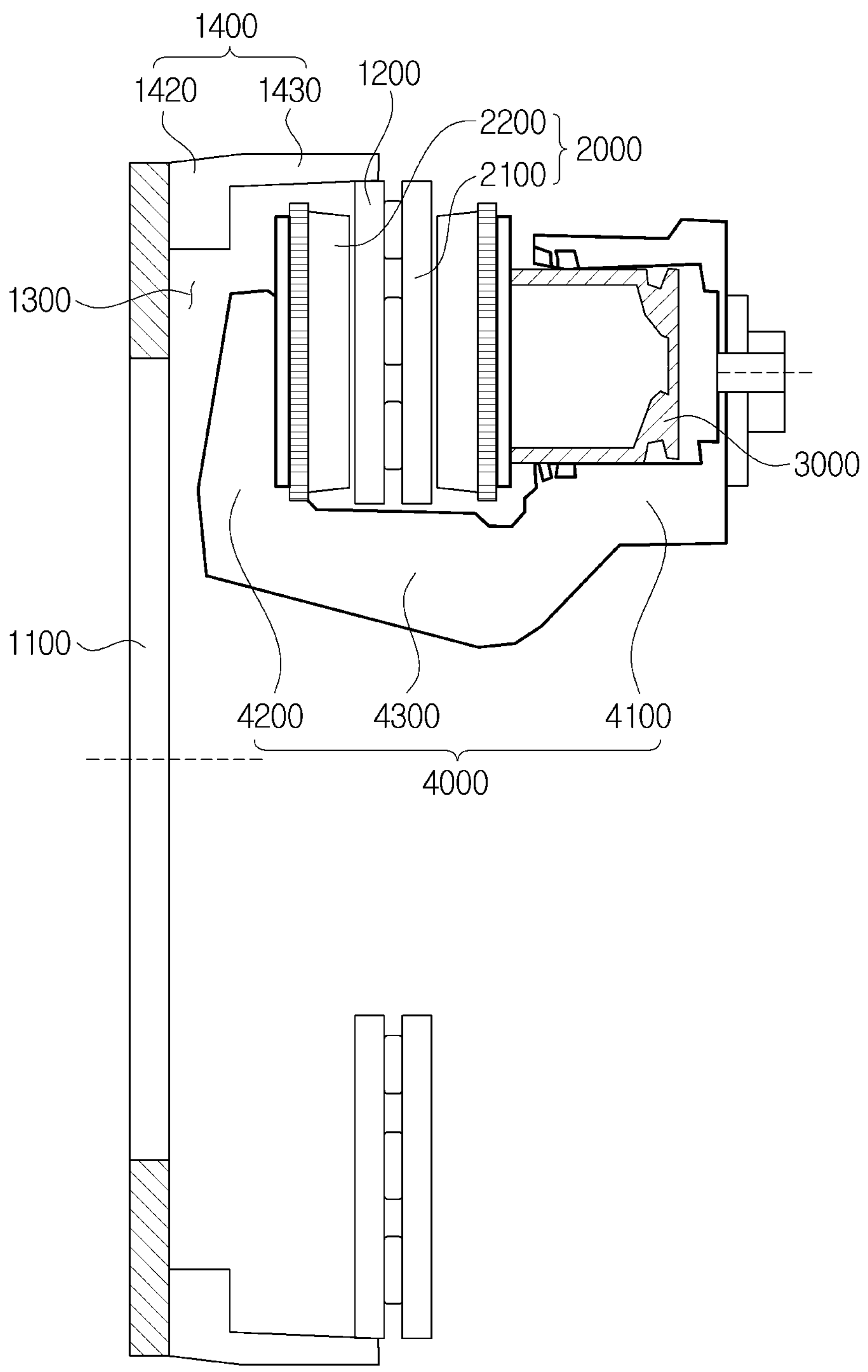

[FIG. 3]
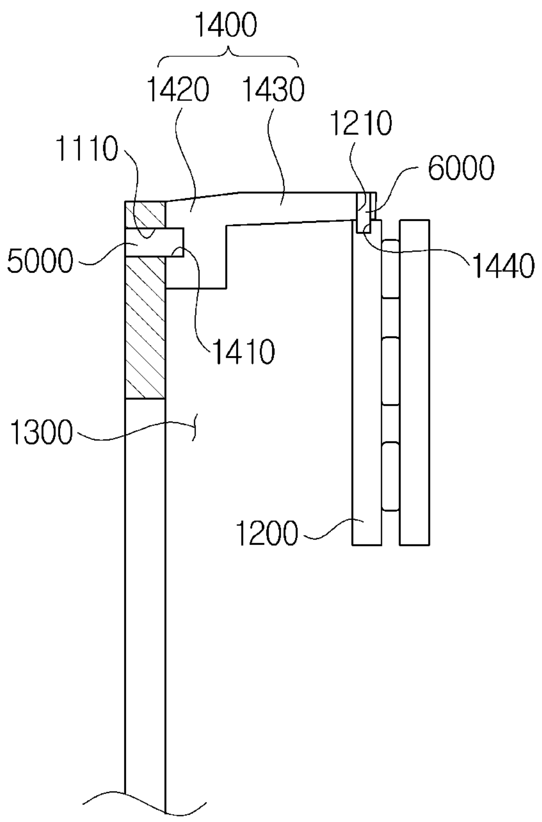

[FIG. 4]
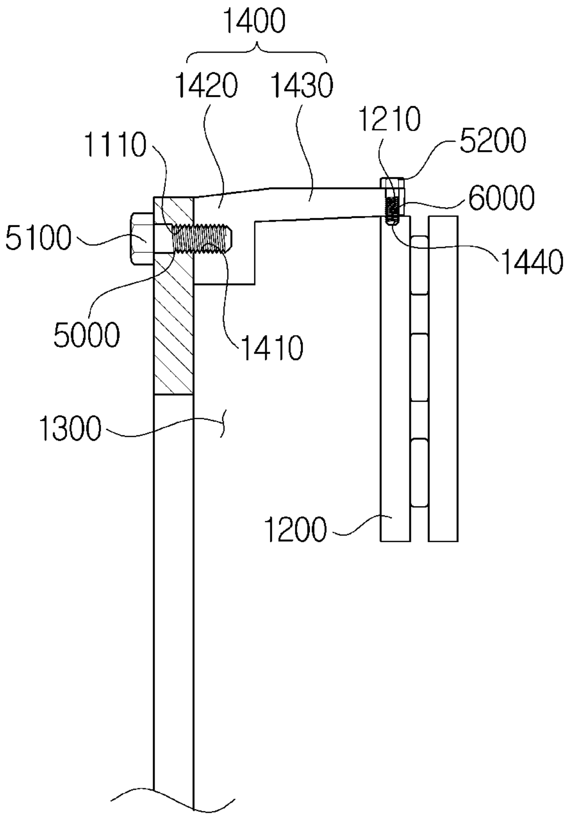

CALIPER BRAKE

CROSS-REFERENCE TO RELATED APPLICATION

Pursuant to 35 U.S.C. § 119(a), this application claims the benefit of earlier filing date and right of priority to German Patent Application No. 102023104123.1, filed on Feb. 20, 2023, the contents of which are hereby incorporated by reference herein in its entirety.

BACKGROUND

1. Technical Field

Embodiments of the present disclosure relate to a caliper brake, and more specifically, to a caliper brake of which brake performance is improved by minimizing a space constraint of a brake disc due to a rim of a vehicle.

2. Description of the Related Art

Generally, vehicles necessarily include braking systems for braking. In a caliper brake which is one of such braking systems, a hydraulic or electronic press member and a brake pad are mounted on a side surface of a brake disc which rotates with a car wheel. When a pedal is stepped on, the brake pad is pressed against the brake disc, and thus a frictional force is generated and used as a braking force.

Specifically, when a vehicle brakes, the press member moves a backplate and the brake pad forward, the frictional force is generated while the brake pad comes into contact with the brake disc, and the vehicle stops.

The brake disc of the conventional caliper brake includes a hub connected to an axle and a rubber which extends from the hub in a radial direction and comes into contact with the brake pad. In this case, since the rubber is provided in a small space present between the disc and an inner portion of a rim of the vehicle, there is a limitation to making the large rubber of the disc. In other words, there is a limitation to securing a diameter of the rubber which actually generates a frictional force to generate a braking force from the brake disc and an effective radius of the brake pad configured to come into contact with the rubber.

Accordingly, a way of improving brake performance of a caliper brake by increasing an effective radius of a brake pad configured to come into contact with a brake disc without a space constraint is required.

SUMMARY

Therefore, it is an aspect of the present disclosure to provide a caliper brake in which a space constraint due to a rim of a vehicle is minimized.

It is another aspect of the present disclosure to provide a caliper brake of which brake performance is improved by increasing a diameter of a rubber of a brake disc configured to come into contact with a brake pad and an effective radius of the brake pad configured to come into contact with the rubber.

It is still another aspect of the present disclosure to provide a caliper brake of which performance is improved and in which replacement cycles of a disc and a brake pad are increased to improve marketability of a vehicle.

In accordance with one aspect of the present disclosure, a caliper brake includes a brake disc configured to rotate with a wheel, an inner brake pad and an outer brake pad each disposed at one of two sides of the brake disc, a press member configured to press the inner brake pad toward the brake disc, and a caliper housing provided so that the press member is movable forward and backward, wherein the brake disc includes a hub connected to an axle, a rubber provided to come into contact with the brake pad and disposed to be spaced a predetermined distance from the hub in an axial direction, and an accommodation part formed between an inner surface of the hub and an outer surface of the rubber to accommodate at least a part of the outer brake pad.

The caliper housing may include a cylinder installed so that the press member moves forward and backward, a finger provided to press the outer brake pad toward the brake disc, and a body connecting the cylinder and the finger, and the body may connect the cylinder and the finger under the rubber.

The brake disc may further include a connector having one side for supporting the hub and the other side for supporting the rubber.

The caliper brake may further include a first connecting pin for fixing the connector to the hub.

The hub may include a first hole passing through an end of the hub in the axial direction, the connector may include a first accommodation groove concavely formed in a surface in contact with the hub, and the first connecting pin may pass through the first hole so that an end of the first connecting pin is seated in and supported by the first accommodation groove.

A screw thread may be formed on an outer circumferential surface of the first connecting pin, and a screw groove to which the screw thread is coupled may be formed in an inner circumferential surface of each of the first hole and the first accommodation groove.

The end of the hub in which the first hole is provided may be formed of a material having a higher strength than a material of a center of the hub.

The connector may include a main body unit in contact with the hub and a protruding unit formed to protrude and extend from the main body unit to the rubber.

A thickness of the protruding unit may be smaller than a thickness of the main body unit.

The caliper brake may further include a second connecting pin for fixing the connector to the rubber.

The connector may include a second hole passing through an end of the connector facing the rubber in a direction perpendicular to an axis, the rubber may include a second accommodation groove concavely formed in a surface in contact with the connector, and the second connecting pin may pass through the second hole so that an end of the connecting pin is seated in and supported by the second accommodation groove.

A screw thread may be formed on an outer circumferential surface of the second connecting pin, and a screw groove to which the screw thread is coupled may be formed in an inner circumferential surface of each of the second hole and the second accommodation groove.

The first connecting pin may be fixedly press-fitted into the first hole and the first accommodation groove.

The second connecting pin may be fixedly press-fitted into the second hole and the second accommodation groove.

The first connecting pin may include a first pin head formed on an outward end of the hub and having a diameter greater than an inner diameter of the first hole.

The second connecting pin may include a second pin head formed on an upward end of the connector and having a diameter greater than an inner diameter of the second hole.

BRIEF DESCRIPTION OF THE DRAWINGS

These and/or other aspects of the disclosure will become apparent and more readily appreciated from the following description of the embodiments, taken in conjunction with the accompanying drawings of which:

FIG. 1 is a cross-sectional view illustrating a conventional caliper brake;

FIG. 2 is an exploded perspective view illustrating a caliper brake according to a first embodiment of the present disclosure;

FIG. 3 is an enlarged view illustrating a state in which components are connected using a first connecting pin and a second connecting pin in a caliper brake according to a second embodiment of the present disclosure; and FIG. 4 is an enlarged view illustrating a state in which components are connected by a screw-coupling method using a first connecting pin including a first pin head and a second connecting pin having a second pin head in a caliper brake according to a third embodiment of the present disclosure.

DETAILED DESCRIPTION OF EMBODIMENTS

Hereinafter, embodiments of the present disclosure will be described in detail with reference to the accompanying drawings. The following embodiments are to provide the spirit of the present disclosure to those skilled in the art. The present disclosure is not limited to the embodiments disclosed herein and may be implemented in different forms. In the drawings, portions which are not related to the description may be omitted for clarifying the present disclosure, and sizes of components may be exaggerated for facilitating understanding of the present disclosure.

FIG. 1 is a cross-sectional view illustrating the conventional caliper brake.

Referring to FIG. 1, the conventional caliper brake includes a brake disc 1000, a brake pad 2000, a press member 3000, and a caliper housing 4000.

When a vehicle brakes, the brake pad 2000 comes into contact with the brake disc 1000 to generate a frictional force. However, a rubber 1200 of the brake disc 1000 configured to come into contact with the brake pad 2000 is provided to extend in a radial direction from a hub 1100 of the brake disc 1000 connected to an axle. Accordingly, a gap between the rubber 1200 of the disc and an inner surface of a rim of the vehicle is small. Since the caliper housing 4000 and the brake pad 2000 of the caliper brake should be provided in a limited space, there was a limitation to increasing a size of the rubber 1200 of the disc or the brake pad 2000. In other words, since the conventional caliper brake has a limitation to increasing a diameter of the rubber 1200 of the brake disc 1000 configured to generate a frictional force and an effective radius of the brake pad 2000, there is a limitation in performance of the brake.

FIG. 2 is an exploded perspective view illustrating a caliper brake according to a first embodiment of the present disclosure.

Referring to FIG. 2, the caliper brake includes a brake disc 1000, a brake pad 2000, a press member 3000, and a caliper housing 4000, and a layout of the brake disc 1000, the brake pad 2000, and the caliper housing 4000 is different from that of the conventional caliper brake.

The brake disc 1000 rotates with a wheel. The brake disc 1000 includes a hub 1100 connected to an axle and a rubber 1200 configured to directly come into contact with the brake pad 2000 to generate a frictional force.

The brake pad 2000 includes an inner brake pad 2100 and an outer brake pad 2200. The inner brake pad 2100 and the outer brake pad 2200 are disposed at two sides of the brake disc 1000.

The press member 3000 is provided outside the inner brake. The press member 3000 may press the inner brake pad 2100 toward the brake disc 1000. The press member 3000 may be a hydraulic press member 3000 or electronic press member 3000.

The caliper housing 4000 accommodates the press member 3000, the brake pad 2000, and the rubber 1200 of the brake disc 1000. In this case, the caliper housing 4000 is provided so that the press member 3000 may move forward and backward.

Specifically, the caliper housing 4000 includes a cylinder 4100 installed so that the press member 3000 moves forward and backward, a finger 4200 provided to press the outer brake pad 2200 toward the brake disc 1000, and a body 4300 connecting the cylinder 4100 and the finger 4200.

The first embodiment of the present disclosure includes an accommodation part 1300 between the hub 1100 and the rubber 1200, and the accommodation part 1300 is provided to accommodate at least a part of the outer brake pad 2200 to solve the conventional problem.

The rubber 1200 of the brake disc 1000 is provided to come into contact with the brake pad 2000 and is provided to be spaced a predetermined distance from the hub 1100 in an axial direction.

A connector 1400 of the brake disc 1000 is provided between the hub 1100 and the rubber 1200. Accordingly, one side of the connector 1400 supports the hub 1100, and the other side supports the rubber 1200.

Accordingly, the accommodation part 1300 of the brake disc 1000 is provided between the connector 1400 and the hub 1100. The accommodation part 1300 is formed between an inner surface of the hub 1100 and an outer surface of the rubber 1200 to accommodate at least a part of the outer brake pad 2200.

The conventional caliper housing 4000 surrounds the rubber 1200 of the brake disc 1000 from above. In contrast, in the first embodiment of the present disclosure, the caliper housing 4000 may be provided so that the body 4300 connects the cylinder 4100 and the finger 4200 under the rubber 1200.

Accordingly, the outer brake pad 2200 and the finger 4200 of the caliper housing 4000 are provided in the accommodation part 1300 of the brake disc 1000 and extend in the axial direction of the hub 1100 of the brake disc 1000 as a diameter of the rubber 1200 of the brake disc 1000 and an effective radius of the brake pad 2000 are increased. Accordingly, unlike the conventional caliper brake, a size of the rubber 1200 of the disc and a size of the brake pad 2000 can be increased without being constrained by a small space in an inner portion of a rim of a vehicle.

Specifically, according to the first embodiment of the present disclosure illustrated in FIG. 2, the accommodation part 1300 is provided in the brake disc 1000, and at least a part of the outer brake pad 2200 and the finger 4200 of the caliper housing 4000 is accommodated in the accommodation part 1300. In this case, in order to increase a frictional force that determines a braking force of the caliper brake, the diameter of the rubber 1200 of the brake disc 1000 and the effective radius of the brake pad 2000 may be increased within a range in which the body 4300 of the caliper housing 4000 does not exceed an axis of the hub 1100.

In addition, the body 4300 of the caliper housing 4000 may be positioned in front of or behind the rubber 1200 of the brake disc 1000 instead of being disposed under the rubber 1200. In this case, the diameter of the rubber 1200 of the brake disc 1000 and the effective radius of the brake pad 2000 may be increased within a range in which a lower end portion of the rubber 1200 or the brake pad 2000 does not exceed the axis of the hub 1100. That is, the diameter of the rubber 1200 of the brake disc 1000 and the effective radius of the brake pad 2000 may extend more greatly compared to a case in which the body 4300 of the caliper housing 4000 is disposed under the rubber 1200.

The connector 1400 may include a main body unit 1420 in contact with the hub 1100 and a protruding unit 1430 formed to protrude and extend from the main body unit 1420 to the rubber 1200.

The protruding unit 1430 may be formed to have a smaller thickness than the main body unit 1420. Accordingly, while the connector 1400 is more strongly fixed to the hub 1100, a space of the accommodation part 1300 may expand. However, a shape and layout of the connector 1400 of the present disclosure are not limited to the first embodiment of the present disclosure and include any shape and layout of the connector 1400 which is disposed between the hub 1100 and the rubber 1200 of the brake disc 1000 and supports the hub 1100 and the rubber 1200 so that the hub 1100 and the rubber 1200 are spaced apart from each other.

Hereinafter, a second embodiment and a third embodiment of the present disclosure will be described. In each of the second embodiment and the third embodiment, a method of coupling a connector 1400 to a hub 1100 and a rubber 1200 of a brake disc 1000 is different from that in the first embodiment. In each of the second embodiment and the third embodiment, the content is the same as that of the first embodiment excluding components described with additional assigned reference numerals. In the second embodiment and the third embodiment, the same content as the first embodiment will be omitted to avoid duplication of the content.

FIG. 3 is an enlarged view illustrating a state in which components are connected using a first connecting pin 5000 and a second connecting pin 6000 in a caliper brake according to the second embodiment of the present disclosure.

Referring to FIG. 3, the second embodiment of the present disclosure includes the first connecting pin 5000 and the second connecting pin 6000 to connect components of a brake disc 1000.

The first connecting pin 5000 fixes a connector 1400 to a hub 1100. Specifically, in the brake disc 1000, the hub 1100 includes a first hole 1110 passing through an end of the hub 1100 in an axial direction, and the connector 1400 includes a first accommodation groove 1410 concavely formed in a surface in contact with the hub 1100. Accordingly, the first connecting pin 5000 passes through the first hole 1110, and an end of the first connecting pin 5000 is seated in and supported by the first accommodation groove 1410 to couple the hub 1100 and the connector 1400.

The first connecting pin 5000 may be fixedly press-fitted into the first hole 1110 and the first accommodation groove 1410.

In the hub 1100, the end in which the first hole 1110 is provide may be formed of a material having a higher strength than a material of a center of the hub 1100.

The second connecting pin 6000 fixes the connector 1400 to a rubber 1200. Specifically, in a brake disc 1000, the connector 1400 includes a second hole 1440 passing through an end of the connector 1400 facing the rubber 1200 in a direction perpendicular to an axis, and the rubber 1200 includes a second accommodation groove 1210 concavely formed in a surface in contact with the connector 1400. Accordingly, the second connecting pin 6000 passes through the second hole 1440, and an end of the second connecting pin 6000 is seated in and supported by the second accommodation groove 1210 to couple the connector 1400 and the rubber 1200.

The second connecting pin 6000 may be fixedly press-fitted into the second hole 1440 and the second accommodation groove 1210.

FIG. 4 is an enlarged view illustrating a state in which components are connected by a screw-coupling method using a first connecting pin 5000 including a first pin head 5100 and a second connecting pin 6000 having a second pin head 6100 in a caliper brake according to the third embodiment of the present disclosure.

A screw thread may be formed on an outer circumferential surface of the first connecting pin 5000, and a screw groove to which the screw thread is coupled may be formed in an inner circumferential surface of each of a first hole 1110 and a first accommodation groove 1410.

A screw thread may be formed on an outer circumferential surface of the second connecting pin 6000, and a screw groove to which the screw thread is coupled may be formed in an inner circumferential surface of each of a second hole 1440 and a second accommodation groove 1210.

Accordingly, the first connecting pin 5000 and the second connecting pin 6000 have coupling structures screw-coupled to components of a brake disc 1000, and thus a coupling force can be increased, and ease of assembly can be improved.

The first connecting pin 5000 may include the first pin head 5100 formed on an outward end of the hub 1100 and having a diameter greater than an inner diameter of the first hole 1110.

The second connecting pin 6000 may include the second pin head 6100 formed on an upward end of the connector 1400 and having a diameter is greater than an inner diameter of the second hole 1440.

Accordingly, when the first connecting pin 5000 and the second connecting pin 6000 are coupled to the components of the brake disc 1000, a coupling force can be increased.

Since the caliper brake according to one embodiment of the present disclosure having such a configuration includes the accommodation part 1300 between the hub 1100 and the rubber 1200 of the brake disc 1000 to accommodate at least a part of the outer brake pad 2000, the diameter of the rubber 1200 and the effective radius of the brake pad 2000 in contact with the rubber 1200 can be increased while minimizing a space constraint due to the rim of the vehicle. Accordingly, braking performance can be improved, replacement cycles of the brake disc 1000 and the brake pad 2000 can be increased, and thus marketability of the vehicle can be improved. In addition, the connector 1400 is provided between the hub 1100 and the rubber 1200 in order to form the accommodation part 1300 of the brake disc 1000, the first connecting pin 5000 and the second connecting pin 6000 are provided in the connector 1400 to support the hub 1100 or the rubber 1200, and the first connecting pin 5000 and the second connecting pin 6000, are implemented with structures to which the first pin head 5100 and the second pin head 5200 are screw-coupled. Therefore, a coupling force between the components can be increased and ease of assembly can be improved.

As is apparent from the above description, a caliper brake in which a space constraint of a brake disc due to a rim of a vehicle is minimized.

A caliper brake of which brake performance is improved by increasing a diameter of a rubber of a brake disc configured to come into contact with a brake pad and an effective radius of the brake pad configured to come into contact with the rubber is provided.

A caliper brake of which performance is improved and in which replacement cycles of a disc and a brake pad are increased to improve marketability of a vehicle is provided.

What is claimed is:

1. A caliper brake comprising:

a brake disc configured to rotate with a wheel;

an inner brake pad and an outer brake pad each disposed at one of two sides of the brake disc;

a press member configured to press the inner brake pad toward the brake disc; and a caliper housing provided so that the press member is movable forward and backward, wherein the brake disc includes a hub connected to an axle, a plate portion of the brake disc provided to come into contact with the inner brake pad and the outer brake pad and disposed to be spaced a predetermined distance from the hub in an axial direction, and an accommodation space formed between an inner surface of the hub and an outer surface of the plate portion of the brake disc to accommodate at least a part of the outer brake pad, wherein the brake disc further includes a connector having a first side for supporting the hub and a second side for supporting the plate portion of the brake disc, wherein the caliper brake further comprises a first connecting pin for fixing the connector to the hub, and wherein:

the hub includes a first hole passing through an end of the hub in the axial direction;

the connector includes a first accommodation groove concavely formed in a surface in contact with the hub; and the first connecting pin passes through the first hole so that an end of the first connecting pin is seated in and supported by the first accommodation groove.

2. The caliper brake of claim 1, further comprising a second connecting pin for fixing the connector to the plate portion of the brake disc.

3. The caliper brake of claim 2, wherein:

the connector includes a second hole passing through an end of the connector facing the plate portion of the brake disc in a direction perpendicular to an axis;

the plate portion of the brake disc includes a second accommodation groove concavely formed in a surface in contact with the connector; and the second connecting pin passes through the second hole so that an end of the second connecting pin is seated in and supported by the second accommodation groove.

4. The caliper brake of claim 3, wherein:

a screw thread is formed on an outer circumferential surface of the second connecting pin; and a screw groove to which the screw thread is coupled is formed in an inner circumferential surface of each of the second hole and the second accommodation groove.

5. The caliper brake of claim 3, wherein the second connecting pin is fixedly press-fitted into the second hole and the second accommodation groove.

6. The caliper brake of claim 3, wherein the second connecting pin includes a second pin head formed on an upward end of the connector and having a diameter greater than an inner diameter of the second hole.

7. The caliper brake of claim 1, wherein the connector includes:

a main body unit in contact with the hub; and a protruding unit formed to protrude and extend from the main body unit to the plate portion of the brake disc.

8. The caliper brake of claim 7, wherein a thickness of the protruding unit is smaller than a thickness of the main body unit.

9. The caliper brake of claim 1, wherein:

the caliper housing includes a cylinder installed so that the press member moves forward and backward, a finger provided to press the outer brake pad toward the brake disc, and a body connecting the cylinder and the finger; and the body connects the cylinder and the finger under the plate portion of the brake disc.

10. The caliper brake of claim 1, wherein:

a screw thread is formed on an outer circumferential surface of the first connecting pin; and a screw groove to which the screw thread is coupled is formed in an inner circumferential surface of each of the first hole and the first accommodation groove.

11. The caliper brake of claim 1, wherein the end of the hub in which the first hole is provided is formed of a material having a higher strength than a material of a center of the hub.

12. The caliper brake of claim 1, wherein the first connecting pin is fixedly press-fitted into the first hole and the first accommodation groove.

13. The caliper brake of claim 1, wherein the first connecting pin includes a first pin head formed on an outward end of the hub and having a diameter greater than an inner diameter of the first hole.

* * * * *